United States Patent [19]
Rosaen

[11] Patent Number: 5,395,090
[45] Date of Patent: Mar. 7, 1995

[54] VALVE FOR HIGH PRESSURE FLUID SYSTEMS

[76] Inventor: Nils O. Rosaen, P.O. Box 242, Clarkston, Mich. 48016-0242

[21] Appl. No.: 965,725

[22] Filed: Oct. 23, 1992

[51] Int. Cl.⁶ ......................................... F16K 31/124
[52] U.S. Cl. ...................................... 251/28; 251/44; 251/63.4
[58] Field of Search ...................... 251/28, 44, 63.4

[56] References Cited

U.S. PATENT DOCUMENTS

| | | | |
|---|---|---|---|
| 3,490,701 | 1/1970 | Malec | 251/28 X |
| 4,153,074 | 5/1979 | Risk | 251/63.4 X |
| 4,307,654 | 12/1981 | De Almeida | 251/63.4 X |
| 4,909,279 | 3/1990 | Nakamura et al. | 251/63.4 X |
| 4,919,166 | 4/1990 | Sims | 137/509 X |
| 5,092,362 | 3/1992 | Yie | 137/596.1 |
| 5,174,544 | 12/1992 | Emanie | 251/44 X |
| 5,186,393 | 2/1993 | Yie | 251/63.4 X |
| 5,241,986 | 7/1993 | Yie | 251/63.4 X |

*Primary Examiner*—Gerald A. Michalsky
*Attorney, Agent, or Firm*—Gifford, Krass, Groh, Sprinkle, Patmore, Anderson & Citkowski

[57] ABSTRACT

A valve for use in high pressure fluid systems includes means for moving a valve assembly between a position opening fluid flow through the valve and a position closing fluid flow through the valve. The valve is opened by the use of system pressure but when the valve is moved to a closed position the effect of the system pressure on the valve is neutralized and closing is accomplished by spring force only, thereby minimizing the effect of closing on the seals to increase seal life.

5 Claims, 2 Drawing Sheets

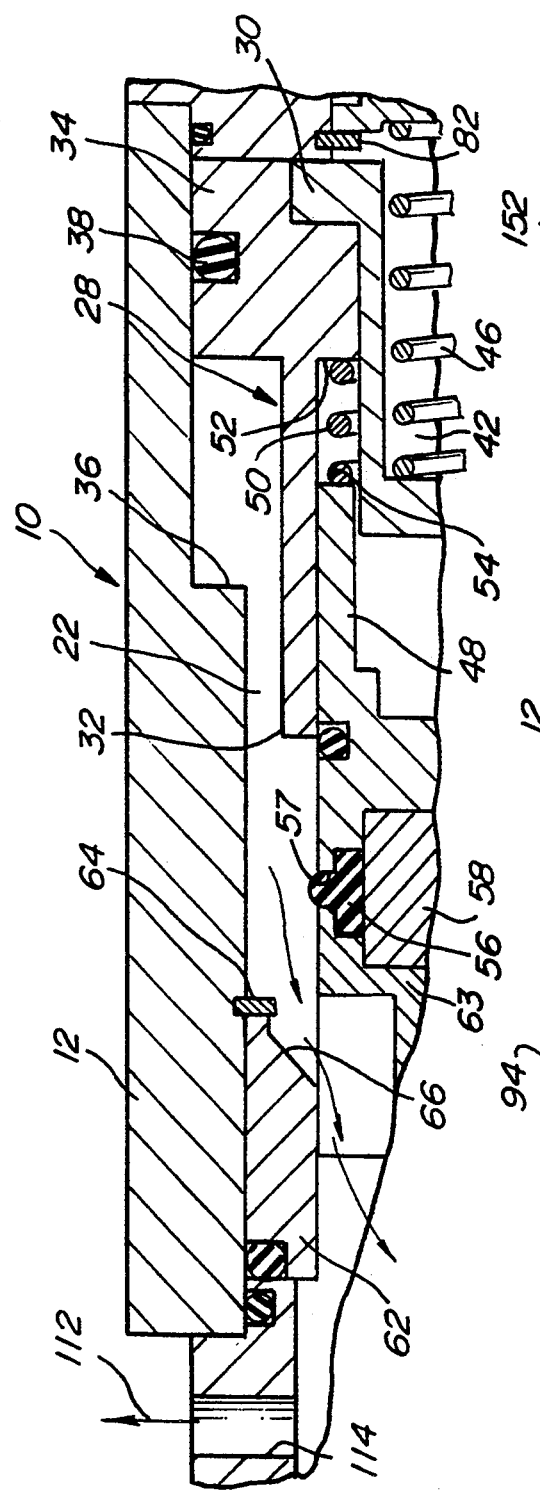
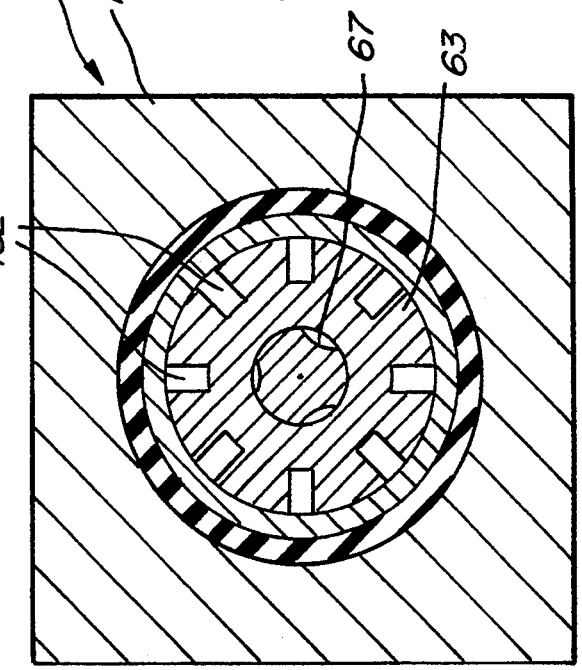
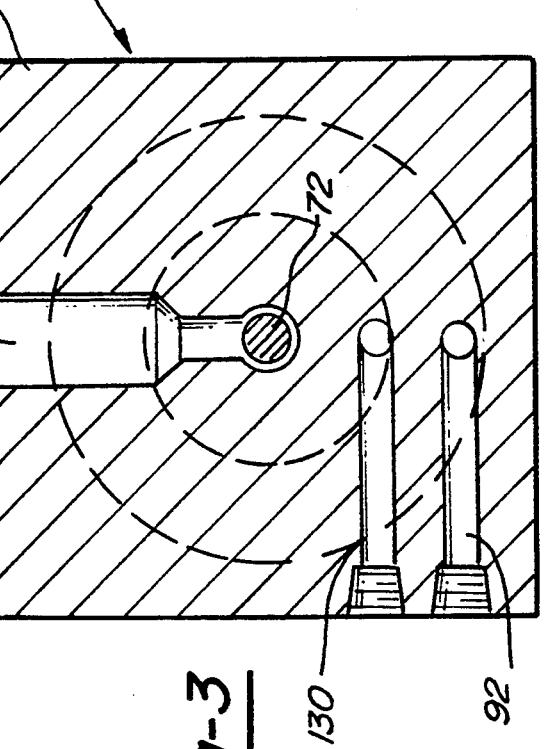

VALVE FOR HIGH PRESSURE FLUID SYSTEMS

FIELD OF THE INVENTION

The present invention relates to valves and more particularly to a fluid operated valve.

BACKGROUND OF THE INVENTION

1. Description of the Prior Art

Many different constructions of valves are known in the art. These valves usually include an inlet for fluid, an outlet for directing the fluid to a desired work application, and a return for collecting the fluid for reuse when the work application has been terminated. Some means are provided internally of the valve for opening and closing fluid flow through the valve.

Such valves, especially when used in high pressure systems, are often damaged by the frequent and severe movement of the metal pieces back and forth against each other over an extended period of time and by shock waves inherent in closing of valves in high pressure systems.

One of the shortcomings with known valves for use in high pressure systems where leakage can be a problem is the requirement that they be demounted from an existing piping structure in the event of damage to or failure of the valve. The inconvenience and attendant damage to the surrounding piping structure is a major drawback to valve replacement. Leaks can occur during re-piping and the system, in that case, would be required to be shut down again to fix the leak.

Another shortcoming is that valves employed in high pressure hydraulic applications tend to require considerable mechanical input in order to actuate the valve from a first to a second position because of the high seal pressure and related high friction forces necessary to insure sealing. This often results in the necessity of increasing the output of an attendant air source beyond what is convenient for the application.

Another problem associated with known valves is that contaminants affect the seal life so severely that especially where chips and the like can find their way into the hydraulic system the life of the valves can be very short.

Still another problem is that in conventional high pressure valves high sealing forces are required to insure a dead tight seal.

SUMMARY OF THE PRESENT INVENTION

The present invention provides a valve for high pressure hydraulic applications which overcomes the above mentioned disadvantages of the prior art devices.

In brief, the valve of the present invention includes a housing having a chamber defined within its interior. An end cap is removably attached to each end of the housing to seal the chamber. The valve further includes a valve assembly which is disposed within the chamber of the housing. The valve assembly includes a valve member which is movable between a first position to permit a fluid to pass from a valve inlet through a valve outlet and to a desired work application. The valve member is movable to a second position to terminate the flow of the hydraulic fluid to the outlet.

The valve assembly may be removed from the chamber of the valve housing upon removal of one of the end caps. In this manner if the valve member needs replacement or repair it can be replaced without disturbing the existing piping structure connecting to and from the valve.

The valve member is preferably actuated by a pneumatic circuit which includes an actuating rod slidably mounted within the valve housing. With air pressure provided to one side of a piston carried by the actuating rod, the actuating rod is moved to a first position to evacuate fluid from one side of the valve member to move the valve member by system pressure to a position opening flow from the inlet to the outlet of the valve. When air pressure is provided to the opposite side of the piston, the actuating rod is moved to a second position in which the evacuation route is closed to equalize the pressure across the valve member to permit spring members to move the valve member to a closed position.

In this way system pressure and spring members are used to move the valve member between its operating positions and thus less pneumatic pressure is necessary than would be required if pneumatic pressure alone were used to produce valve movement.

The movement of the valve member is cushioned by the use of the combined pneumatic pressure actuating means, the system pressure and the spring forces so that pressure shocks in the system are avoided and there is less wear on the various parts of the valve including the seals which are employed to seal the inlet from the outlet when the valve is in its closed position.

The modular construction of the valve assembly permits the valve assembly to be readily removed from the housing without disturbing the piping in the event that the valve malfunctions or requires repair. A new valve assembly can be used to replace the defective or worn assembly so that it can be repaired after the system is back in operation. Since the housing and the piping are not disconnected during this process there is little likelihood that the process will result in leaks which have to be taken care of before the system can be put back into operation. This is an especially difficult problem in high pressure systems.

BRIEF DESCRIPTION OF THE DRAWING

A better understanding of the present invention will be had upon reference to the following detailed description, when read in conjunction with the accompanying drawings, wherein:

FIG. 2 is a fragmentary longitudinal cross-sectional view showing a portion of the structure shown in FIG. 1 but illustrating the valve member in an open position;

FIG. 3 is a transverse cross-sectional view as seen substantially from line 3—3 of FIG. 1; and FIG. 4 is a cross-sectional view as seen substantially from line 4—4 of FIG. 1.

DETAILED DESCRIPTION OF A PREFERRED EMBODIMENT OF THE PRESENT INVENTION

Figure 1:
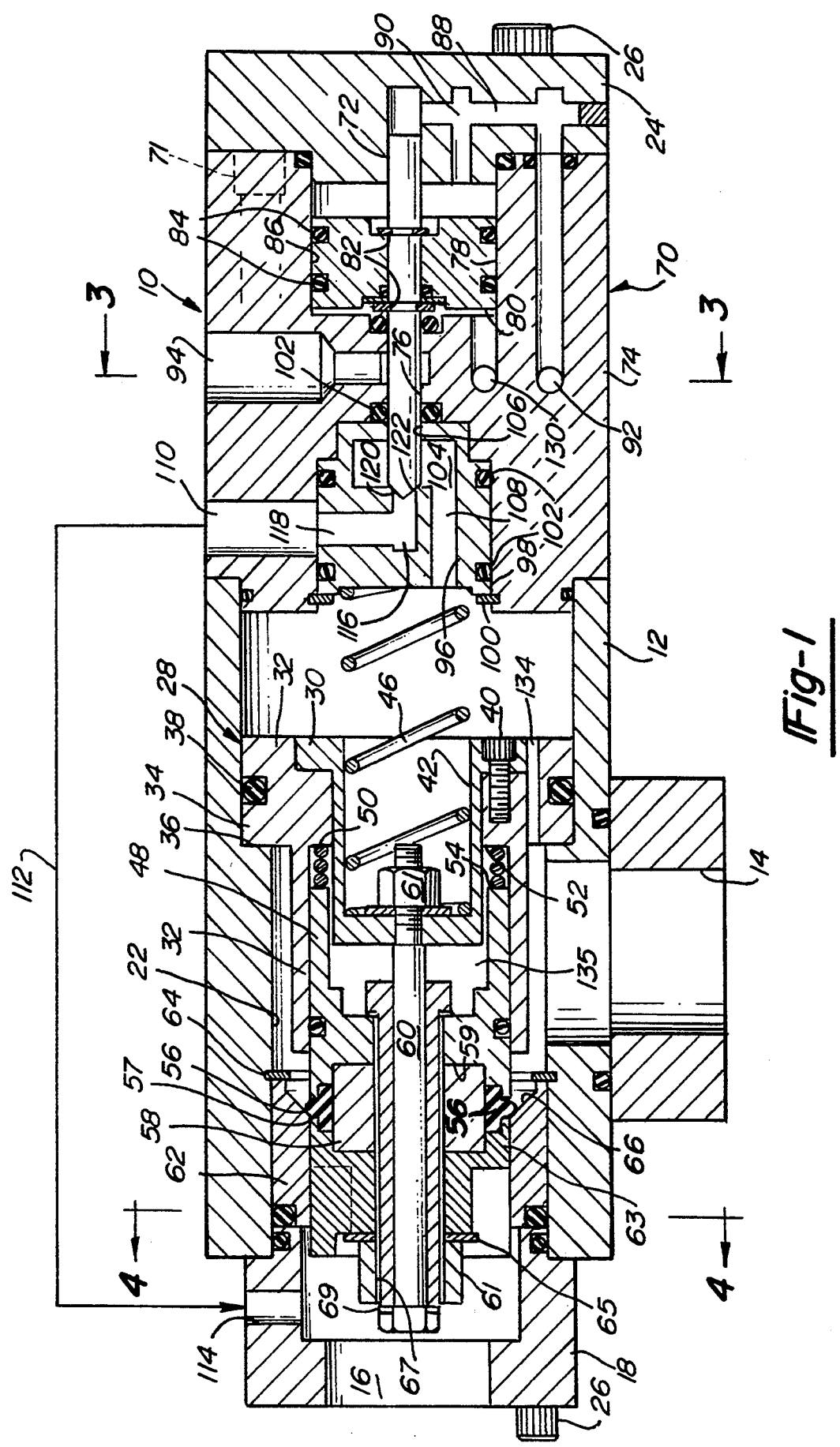
FIG. 1 is a longitudinal cross sectional view of the valve of the present invention illustrating the valve member in the closed position.

With reference to FIGS. 1-4, a preferred embodiment of the valve 10 of the present invention is shown. As can be seen in FIG. 1, the valve 10 has a housing 12 and an inlet port 14 is provided on one side of the housing 12 opening to a chamber 22. An outlet port 16 is formed in an end cap 18 and also opens to the chamber 22. The housing 12 is constructed of any solid material, preferably a steel or other metal.

The valve housing 12 has a hollow interior defining the substantially cylindrical chamber 22 and the valve 10 further includes an end cap 24 secured to the end of the housing 12 opposite the end cap 18. The end caps 18 and 24 are preferably attached to the housing 12 by means of a plurality of bolts 26. A valve assembly 28 is axially slidably mounted within the chamber 22 of the housing 12.

The valve assembly 28 preferably comprises an inner cylindrical member 30 and an outer cylindrical member 32. The outer cylindrical member 32 is provided with an enlarged annular portion 34 which in the position of the valve assembly 28 as seen in FIG. 1 abuts a shoulder 36 formed in the housing 12 and which extends into the chamber 22. A seal 38 seals the cylindrical member 32 with respect to the interior wall forming the chamber 22.

Still referring to FIG. 1 the inner cylindrical member 30 is coaxially mounted to the outer cylindrical member 32 by a plurality of bolts 40 (only one of which is shown) and extends axially into the interior of the outer member 32. A spring cavity 42 is formed in the inner cylindrical member 30 to receive one end of a spring 46 which biases the cylindrical members 30, 32 and thus the valve assembly 28 axially in the chamber 22 in a direction toward the end cap 18.

The valve assembly 28 further comprises a valve member 48 mounted between the inner cylindrical member 30 and the outer cylinder member 32 and axially movable with respect to the cylindrical members 30 and 32. A spring 50 biased between an annular shoulder 52 formed in the outer cylindrical member 32 and an end surface 54 of the valve member 48 urges the valve member 48 in an axial direction toward the end cap 18.

A seal 56 is mounted to the valve member 48 and has a portion which extends radially outwardly through an opening 57 provided in the valve member 48. A cylindrical mount 58 positions and retains the seal 56 and is carried in a cavity 59 formed in the interior of the valve member 48. A bolt 60 extends through the valve member 48, and the mount 58 and axially slidably mounts the valve member 48 to the inner cylindrical member 32.

The bolt 60 and a nut 61 hold the valve assembly 28 consisting of the valve member 48, the seal 56, the mount 58, a guide member 63, and a washer 65 together. The bolt 60 has a sufficient clearance to form a passage 67 which permits fluid to move from chamber 135 to outlet 16. A slot 69 provided in the head of the bolt 60 insures communication between passage 67 and the outlet 16.

An annular valve seat member 62 is carried in the chamber 22 between the end cap 18 and a stop ring 64 mounted in the housing 12. The valve seat member 62 is provided with an angular valve face 66 which coacts with the seal 56 to prevent flow therepast, and in a manner which will become more apparent as the description proceeds, closes flow between the inlet 14 and the outlet 16 when the valve member 48 is in an axial position such that the seal 56 seats against the valve face 66.

Although other means can be provided to move the valve member 48 between an open and closed position the preferred means is best seen in FIG. 1 as comprising a pilot valve assembly 70 mounted to the end of the valve housing 12 opposite the end cap 18 and between the end cap 24 and the housing 12 by bolts as shown in phantom at 71. An actuating rod 72 is axially slidably mounted in the end cap 24 and extends axially toward the end cap 18. A pilot valve body 74 is provided with an axial bore 76 which slidably receives the rod 72 and has an enlarged portion 78 which receives a piston 80 mounted to the rod 72 by snap rings 82. Seals 84 prevent air passage between the piston 80 and a wall 86 of the pilot valve body 74 defining the chamber 78. Air passages 88 and 90 formed in the end cap 24 connect a source of pressurized air (not shown) with the end of the actuating rod 72 and one face of the piston 80 through an inlet 92 passage (FIG. 3) so that air pressure supplied to the inlet 92 passage causes the piston 80 and the rod 72 to move to the left and toward the end cap 18 as seen in FIG. 1. A second inlet passage 130 connects the source of air pressure with the inner face of the piston 80. The pilot valve body 74 is provided with a drain port 94 connecting the bore 76 to atmosphere.

A cylindrical block 96 is axially mounted by a snap ring 100 in an end cavity 98 formed in the pilot valve body 74. O ring seals 102 prevent fluid passage between the block 96 and the pilot valve body 74. A fluid chamber 104 is formed in the inner end of the block 96. The end of the actuating rod 72 extends through a bore 106 provided in the end of the cylindrical block 96. As can best be seen in FIG. 1 a passage 108 formed in the block 96 provides communication between the chamber 42 and the chamber 104. A port 110 formed in the pilot valve body 74 connects with the outlet port 16 by way of piping 112 and a port 114 formed in the end cap 18. The port 110 communicates with an axial chamber 116 formed in cylindrical block 96 through a radial passage 118 also formed in the cylindrical block 96.

The actuating rod 72 is formed with a frusto-conical end 120 which engages a valve face 122 in the position of the actuating rod 72 shown in FIG. 1 to close communication between the chamber 104 and the chamber 116 and thus to close communication between the chamber 42 and the outlet 110.

As best seen in FIG. 1 the cylindrical member 32 is provided with a passage 134 which connects the chamber 42 with the inlet side of the valve member 48. With the outlet 110 closed to the chamber 42 the passage 134 permits the system pressure to equalize across the valve member 48 so that the valve member 48 is moved axially toward the closed position and is maintained in the closed position solely by the spring forces produced by springs 46 and 50. Initial movement of the valve member 48 toward a closing position is produced by the force of spring 46 which moves the valve member 48 to the left as seen in FIG. 1 until the outer cylindrical member 34 engages the shoulder 36. The valve member 48 continues to move toward the valve closing position by reason of the force produced by spring 50 which moves the valve member 48 axially to the left away from the cylindrical members 32, 34 until the seal 56 engages the valve face 66.

As can best be seen in FIG. 4, the guide member 63 provided on the outlet end of the valve member 48 is provided with a plurality of slots 152 which provide communication between the inlet 14 and the outlet 16 and which with the pressure balancing provided by the slots 67 and 69 produce a balanced system pressure so as to not impede movement of the valve member 48 as it is moving toward its closing position.

To maintain the valve assembly 28 in the closed position it is only necessary to provide air pressure to inlet port 92 to maintain the valve end 120 of the actuating rod 72 against the valve face 122 to thereby prevent flow from the chamber 42 through the outlet 110.

When it is desired to open fluid flow between the inlet port 14 and the outlet port 16 air pressure is provided to the inner side of the piston 80 through the passage 130 to move the piston 80 and the actuating rod 72 to the right and toward the end cap 24 as best seen in FIG. 1. The end 120 of the actuating rod 72 is thereby moved away from the valve face 122 to permit fluid to flow from the chamber 42 through the port 110 and to the outlet 16. Inlet pressure acts upon the shoulder 34 and the inner end of the outer cylindrical member 32 to cause the valve assembly 28 to move to the right against the force of springs 50 and 46 to move the seal 56 away from the valve face 66. Flow is then opened directly between the inlet 14 and the outlet 16 of the valve 10.

It is clear from the above description that what system shocks that are produced by operation of the valve occur only during the initial operation of the valve as it moves from its open position to its closed position. The movement of the outer cylindrical member 32 against the shoulder 36 is produced solely by the spring 46 and is independent of system pressures and therefore can be regulated by selection of the spring 46. In any event wear as caused by operation of the valve will be minimal in this area because the shoulder and the cylindrical member can be made of material that will resist wear. Further since sealing doesn't take place in this area wear is not critical.

Wear of the seal 56 is critical, however, because unless a good seal is obtained between seal 56 and face 66 the valve will not function properly. In systems where system pressure is used to move the valve, wear of the seal is a problem and this is especially true in systems where high pressures are utilized. In the present invention a relatively light force can be used to produce the final movement of the valve member 48 into a position in which the seal 56 sealingly engages the seal face 66. This is accomplished in the preferred embodiment by the relatively light spring 50 and since only relatively light force is required a relatively inexpensive seal such as an O-ring seal can be used to accomplish the sealing function. When the spring 50 is producing final closing movement of the valve system pressure has been equalized across the valve and therefore has no effect on operation of the valve at this point.

In addition to being less costly than similar valves for high pressure systems, the valve of the present invention is also more reliable than other valves of the prior art. It is designed for frequent and repeated operation and the cushioning effect provided by the springs 46 and 50 as well as the chambers 42, 134, and 135 prevents the parts from being suddenly slammed from one position to another causing wear, damage and pressure surges. Conventional operating valves require prohibitively frequent repair and replacement. In the event that repair of the valve of the present invention is necessary it can be readily accomplished without it being necessary that the piping of the system be disturbed or that the system be shut down for long periods of time while repair is taking place. In the present invention it is only necessary to remove the end cap 24 and the pilot valve body 74 to then remove the valve assembly 28 as a unit to be replaced by a new assembly. The worn assembly can be repaired after the system is put back into operation.

Having described my invention, many other advantages as well as many modifications thereto will become apparent to one skilled in the art to which the invention pertains without departing from the spirit of the invention as defined by the scope of the appended claims.

I claim:

1. A valve for use in a high pressure fluid system, said valve comprising:
    a housing having a chamber therein and an inlet and an outlet open to said chamber;
    a valve assembly mounted in said housing and movable between a position opening and a position closing fluid flow from said inlet through said chamber and to said outlet;
    said valve assembly including an inner cylindrical member coaxially mounted to an outer cylindrical member, said inner cylindrical member extending axially into an interior of said outer cylindrical member;
    said valve assembly further including a valve member mounted between said inner cylindrical member and said outer cylindrical member;
    means for selectively moving said valve assembly between said opening and closing positions;
    said moving means comprising means utilizing pressure fluid at said inlet for moving said valve assembly to said opening position, spring means for moving said valve to said closing position and means for balancing the effects of inlet pressure on said valve assembly as said valve assembly is moving to said closing position;
    said spring means including a first spring biasing said inner cylindrical member and said outer cylindrical member toward said closing position, stop means engaging said valve assembly to prevent further movement of said valve assembly by said first spring;
    said spring means further comprising a second relatively light spring biased between said outer cylindrical member and said valve member and operable, upon said inner and outer cylindrical members being prevented by said stop means from further movement by said first spring, to urge said valve member to said closing position; and
    a flexible seal means carried by said valve member and engageable with said housing to prevent fluid flow from said inlet to said outlet when said valve assembly is in said closing position.

2. The valve as defined in claim 1 and in which said seal is an O-ring seal.

3. The valve as defined in claim 1 and in which said means moving said valve assembly toward said opening position comprises said valve member having fluid pressure responsive means operable upon an increased pressure differentiated across said fluid pressure responsive means to move said seal away from said valve seat.

4. The valve as defined in claim 3 and in which said fluid pressure responsive means comprises an annular member having one side thereof open to inlet pressure and moveable in response to an increase in pressure across said annular member to move said valve toward said open position.

5. The valve as defined in claim 1 wherein said second spring biases said valve assembly against a down-stream pressure existing at said outlet.

* * * * *